Aug. 10, 1943.　　　W. T. PEIRCE　　　2,326,557
ELECTRIC CABLE
Filed Sept. 13, 1941
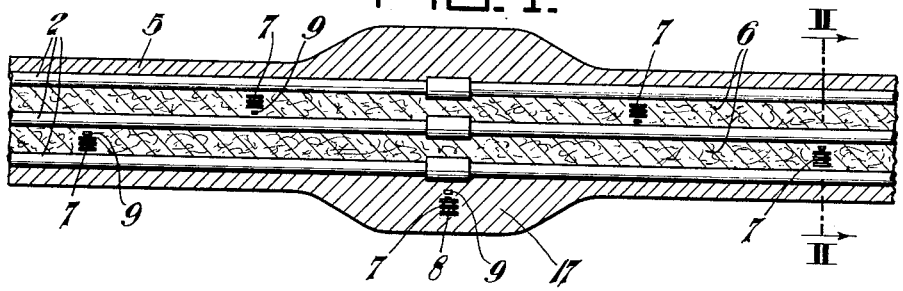
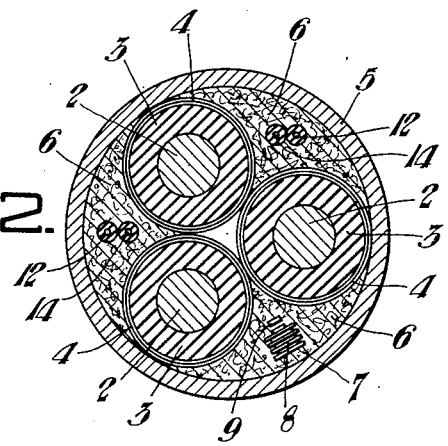
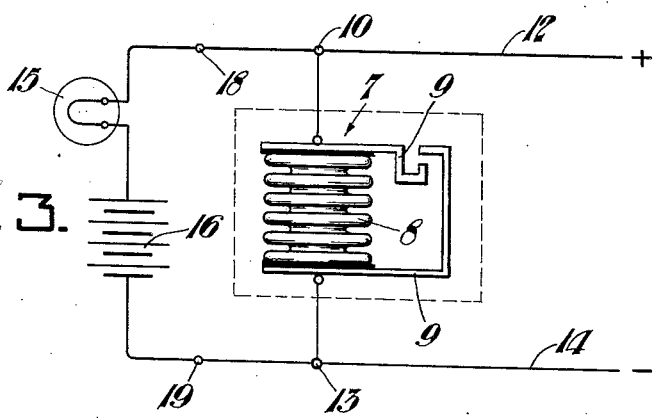
Inventor:
WALTER T. PEIRCE,
by: John E. Jackson
his Attorney.

Patented Aug. 10, 1943

2,326,557

UNITED STATES PATENT OFFICE 2,326,557

ELECTRIC CABLE

Walter T. Peirce, Worcester, Mass., assignor to The American Steel and Wire Company of New Jersey, a corporation of New Jersey Application September 13, 1941, Serial No. 410,770

3 Claims. (Cl. 174—11)

This invention relates to electric cables and, particularly, to an improved means which is adapted to be arranged therein for indicating any defects in such cables.

It is the general practice, in insulated electric cables which are adapted for certin uses, to introduce a positive pressure of either gas or oil within the cable to improve the electrical transmission characteristics thereof. However, if the outer covering or sheathing, which is usually lead or some other suitably heavy pressure-tight covering, is ruptured or broken, the pressure within the cable is naturally reduced as the oil or gas escapes therefrom and the required pressure cannot be maintained, making the cable unfit for further use. Consequently, such a failure necessitates the removal of the cable from service and the replacement or repair thereof. Thus, it will be seen that it is important to know without delay when and where such failure occurs in the cable so that it can be remedied.

Accordingly, the present invention relates to a means for ascertaining at once when the pressure in such cables drops below a predetermined value so that the cable can be promptly replaced or repaired. The improved means of my invention not only indicates when the pressure therein drops below a predetermined amount, but the point of failure or of leakage of pressure therefrom can be readily ascertained. In carrying out the present invention, there is proposed a cable system consisting of an insulated conductor for the purpose of carrying power, and according to the present invention there is included in the same structure a pilot wire connected to a pressure sensitive contact also contained in the same structure, which would complete or break the pilot wire circuit in case the pressure dropped below a predetermined value.

It is another object of the invention to provide an improved means for determining the drop in pressure in electrical cables of the class described which is simple and inexpensive in its construction and, at the same time, efficient and effective in its use. It is the general object of the present invention to provide a plurality of pressure responsive means arranged at spaced apart intervals within an electrical cable of the class described and throughout the length thereof, which will indicate when the pressure drops below a predetermined amount in that portion of the cable in which the particular pressure responsive means is located.

Various other objects and advantages of this invention will become more apparent during the course of the following specification and will be particularly pointed out in the appended claims.

In the accompanying drawing there is shown, for the purpose of illustration, one embodiment which my invention may assume in practice.

In the drawing:

Figure 1 is a longitudinal section of a three conductor type of electric power cable showing the improved pressure sensitive means of my invention incorporated therewith;

Figure 2 is a section taken on the line II—II of Figure 1; and

Figure 3 is a view showing the wiring diagram, together with one of the pressure sensitive relays of the type adaptable for use.

Referring more particularly to the drawing, the improved pressure indicating means of my invention is shown for the purpose of illustration incorporated with a conventional type electric power cable, comprising three electrical conductors 2 with each having insulation 3 and a shielding tape 4 arranged therearound. All three of the conductors are enclosed by an outer sheathing 5 which is usually made of lead. There is arranged in the space between the sheathing 5 and the conductors 2, that is, in the interstices between the conductors 2, a filler material 6. A positive pressure of oil, gas or some other suitable fluid is conveyed into the interior of the cable by a means (not shown) in a manner well known to those skilled in the art.

According to the present invention, as shown in Figures 1 and 2 of the drawing, there is arranged in the space between the sheathing 5 and the conductors 2, that is, in the present instance, in each of the interstices between the conductors, at spaced apart intervals throughout the length of the cable, a plurality of pressure responsive devices or relays 7. Each of the devices 7, as shown in Figure 3, consists preferably of a pressure sensitive bellows 8 having a contact member 9 arranged on each end thereof, each of which is adapted to cooperate with the other. One of the contact members 9 of each of the devices 7 is connected preferably to one side of an electric circuit as at 10 to a pilot wire 12, as shown in Figure 3, and the other contact member is connected to the opposite side of the circuit as at 13 to a pilot wire 14. There is connected in parallel with the pressure responsive devices of relays 7 a signalling device such as a bell or lamp 15, and a battery 16, as a source of power, or another suitable source of power may be provided for supplying the current to the circuit, if desired.

The relays or devices 7 are arranged preferably at intervals of about 100 feet throughout the length of the cable and are preferably staggered as shown in Figure 1 of the drawing with at least one of the relays positioned at each of the joints 17 between the sections of the cable, as shown. The pilot wire or wires 12 and 14 to which each of the relays or devices 7 is connected are preferably arranged within the filler material in the interstices between the conductors 2 and extend therealong throughout the length of the cable.

Thus, it will be seen that when there is a loss of pressure within the cable due to a fracture thereof or for some other reason, the pressure therein drops below a predetermined amount, and the bellows 8 of the pressure responsive device or relay located in that portion of the cable where the pressure is below normal will expand so as to move contact members 9 into engagement with each other thereby completing the circuit therethrough and lighting the lamp 15 or actuating the bell or other indicating means provided. After such signal or alarm has been given, the system is preferably disconnected as at 18 and 19 and the battery 16 and lamp 15 are replaced preferably by a resistance bridge to locate the position of the relay which gave the alarm by means of conventional faulty circuit location methods.

It will be understood that a bellows 8 as shown and described may be provided in the relays or pressure responsive devices 7, or a diaphragm may be provided which, by its mechanical movement under pressure, would either open or close electrical contacts 9, or, if desired, a length of semi-conducting rubber may be provided, the resistance of which would vary according to the pressure applied thereto, or any other suitable pressure sensitive means might be used.

Also, it might be desirable to employ a single pilot wire in place of two, as shown. In such case, the pressure sensitive relay would be arranged to complete a circuit between the single pilot wire and the lead sheathing, thus giving a signal or an alarm upon failure of the cable and the location of the point of failure could be easily and quickly located by the usual fault-locating methods, such as by the Murray or Varley loop resistance tests. If two or more pilot wires are used, the relays could be arranged to complete a circuit between the wires, as shown and described, or a series type of circuit could be employed in which case the relays would be normally closed and adapted to cause an open circuit in case of a pressure drop within the cable. Such an open circuit could be conveniently located by the usual capacity measurements.

While I have shown and described one specific embodiment of my invention, it will be understood that this embodiment is merely for the purpose of illustration and description and that various other forms may be devised within the scope of my invention, as defined in the appended claims.

I claim:

1. In an electric cable of the class described into which a fluid dielectric is introduced under high positive pressure for improving the electrical transmission characteristics thereof, an insulated electrical conductor having an outer sheathing arranged therearound so as to provide a space between the conductor and the sheathing, an electrical circuit including a plurality of pressure responsive devices arranged within the cable in the space between the insulated conductor and the sheathing, said pressure responsive devices arranged at spaced apart intervals and in staggered relation throughout the length of the cable, a pair of pilot wires arranged substantially parallel to the conductor in the space between the same and the sheathing interconnecting said pressure responsive devices, a substantially solid insulation arranged in the space between the conductor and the sheathing for supporting and positioning said responsive devices together with said pilot wires therein, and a signaling mechanism arranged in said electrical circuit with said responsive devices whereby said signaling mechanism is actuated by said pressure responsive devices when the fluid pressure is abnormal in that portion of the cable where any particular responsive device is located.

2. In an electric cable of the class described into which a fluid dielectric is introduced under high positive pressure for improving the electrical transmission characteristics thereof, three insulated electrical conductors arranged so that their axes are concentrically arranged around the center of the cable whereby interstices are provided between the conductors, an outer sheathing arranged around all of the conductors, an electrical circuit including a plurality of pressure responsive devices arranged within the cable in each of the interstices between the conductors, said devices being arranged at spaced apart intervals throughout the length of the cable with the responsive devices in one interstice being staggered relative to the responsive device in the other interstices, a pair of pilot wires arranged substantially parallel to the conductors in each of the interstices interconnecting the responsive devices arranged in that interstice, a substantially solid insulation arranged in the interstices between the conductors and the outer sheathing for supporting and positioning the said responsive devices together with said pilot wires therein, and a signaling mechanism arranged in said electrical circuit with the responsive devices whereby said signaling mechanism is actuated by said pressure responsive devices when the fluid pressure is abnormal in that portion of the cable where any particular responsive device is located.

3. In an electric cable of the class described into which a fluid dielectric is introduced under high positive pressure for improving the electrical transmission characteristics thereof, an insulated electrical conductor having an outer sheathing arranged therearound so as to provide a space between the conductor and the sheathing, an electrical circuit including a plurality of pressure responsive devices arranged within the cable in the space between the insulated conductor and the sheathing, at spaced intervals throughout the length of the cable, at least one pilot wire arranged substantially parallel to the conductor in the space between the same and the sheathing interconnecting said pressure responsive devices, a substantially solid insulation arranged in the space between the conductor and the sheathing for supporting and positioning said responsive devices together with said pilot wire therein, and a signaling mechanism arranged in said electrical circuit with said responsive devices whereby said signaling mechanism is actuated by said pressure responsive devices when the fluid pressure is abnormal in that portion of the cable where any particular responsive device is located.

WALTER T. PEIRCE.